United States Patent
Bradford et al.

(10) Patent No.: US 12,042,097 B2
(45) Date of Patent: Jul. 23, 2024

(54) COOKING TOOL KIT WITH OFFSET HANDLES

(71) Applicants: Robin F. Bradford, Soddy Daisy, TN (US); Lawrence J. Bradford, III, Soddy Daisy, TN (US)

(72) Inventors: Robin F. Bradford, Soddy Daisy, TN (US); Lawrence J. Bradford, III, Soddy Daisy, TN (US)

( * ) Notice: Subject to any disclaimer, the term of this patent is extended or adjusted under 35 U.S.C. 154(b) by 665 days.

(21) Appl. No.: 17/189,758

(22) Filed: Mar. 2, 2021

(65) Prior Publication Data
US 2021/0267419 A1 Sep. 2, 2021

Related U.S. Application Data

(60) Provisional application No. 62/983,855, filed on Mar. 2, 2020.

(51) Int. Cl.
*A47J 43/28* (2006.01)
*B25G 1/04* (2006.01)
*B25G 3/38* (2006.01)
*B25G 3/12* (2006.01)

(52) U.S. Cl.
CPC ........... *A47J 43/288* (2013.01); *A47J 43/283* (2013.01); *B25G 1/04* (2013.01); *B25G 3/38* (2013.01); *A47J 2202/00* (2013.01); *B25G 3/12* (2013.01)

(58) Field of Classification Search
CPC ......... A47J 43/288; A47J 43/283; B25G 1/04; B25G 3/12; B25G 3/38
USPC ............... 294/1, 7, 16, 61, 14, 26
See application file for complete search history.

(56) References Cited

U.S. PATENT DOCUMENTS

| | | | | |
|---|---|---|---|---|
| D187,937 S | * | 5/1960 | Polk | D7/686 |
| D631,710 S | * | 2/2011 | Jossem | D7/686 |
| D692,284 S | * | 10/2013 | Horito | D7/686 |
| D746,644 S | * | 1/2016 | Cai | D7/645 |
| D855,416 S | * | 8/2019 | Klipshtein | D7/686 |
| 2003/0097759 A1 | * | 5/2003 | Bond | A47J 43/288 30/340 |
| 2004/0026939 A1 | * | 2/2004 | Jordan | A47J 43/283 294/7 |
| 2005/0138736 A1 | * | 6/2005 | Tarlow | A47G 21/06 7/110 |
| 2011/0044370 A1 | * | 2/2011 | Schochet | G01K 13/00 374/E1.002 |
| 2013/0305893 A1 | * | 11/2013 | Kaufman | B26D 3/00 7/113 |
| 2015/0305570 A1 | * | 10/2015 | Gibson | A47J 43/288 294/24 |
| 2016/0066723 A1 | * | 3/2016 | Prommel | A47J 43/283 30/124 |
| 2018/0360273 A1 | * | 12/2018 | Bergin | A47J 43/283 |
| 2023/0037008 A1 | * | 2/2023 | Jaggard | A47J 43/283 |
| 2023/0048491 A1 | * | 2/2023 | Prandelli | A47J 43/288 |

* cited by examiner

*Primary Examiner* — Paul T Chin
(74) *Attorney, Agent, or Firm* — Miller & Martin PLLC

(57) ABSTRACT

A kit has a handle with first and second handle portions asymmetrically disposed above a pivot. The pivot may be collinear with the first handle portion and connected by an offset leg to the second handle portion. Various instrument arms connected to instrument heads are preferably provided as a kit with the handle. The arms may be sectionally disposed or integral with instrument heads selected from the group of forks, such as meat forks, pasta forks, etc, grippers, spatulas, etc.

13 Claims, 8 Drawing Sheets

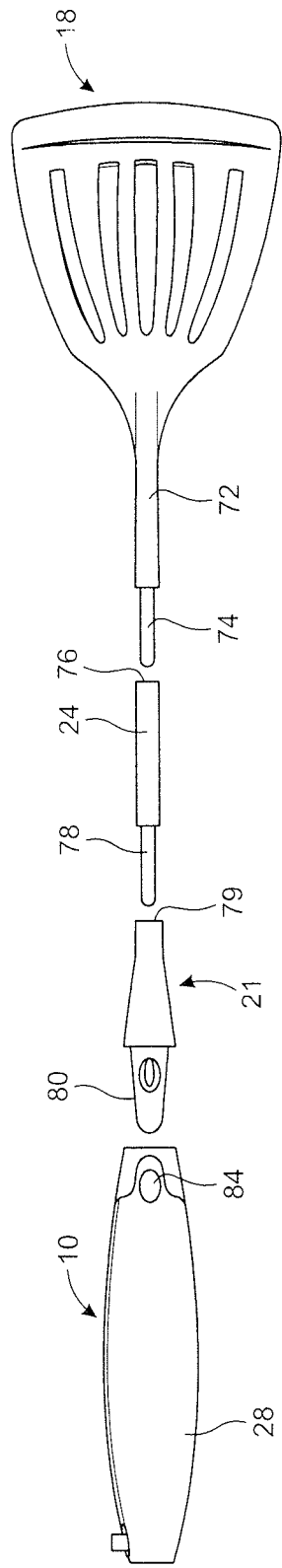
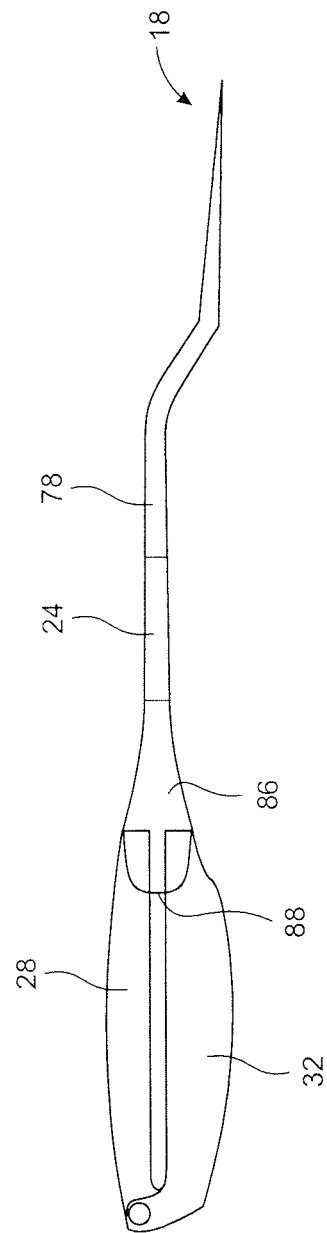
FIG. 6
FIG. 7

COOKING TOOL KIT WITH OFFSET HANDLES

CLAIM OF PRIORITY

This application claims the benefit of U.S. Provisional Application No. 62/983,855 filed on Mar. 2, 2020.

FIELD OF THE INVENTION

The present invention relates to a versatile cooking tool for use in preparing and/or serving food.

BACKGROUND OF THE INVENTION

Tongs, spatulas, cooking forks, pasta forks, and/or other cooking implements utilized in the kitchen for cooking and/or preparing food have been used for decades. These devices are typically single use structures. A spatula normally has a spatula end on one end and a handle on the other. A fork normally has a fork end on one end and a handle on the other.

Tongs are typically constructed so as to be able to grab articles between adjacent instrument ends. A pivot is normally oriented along centerlines of the arms respectively, or is at least symmetrically disposed relative to the arms. Tongs may be utilized to grab salad, meat or other items. While some rather ingenious tong structures have been sold in the marketplace, such as those including a spatula on one side and a fork type structure on the other (with the fork shorter in length than the spatula), even these improved devices are permanently constructed to have the fork on one arm and the spatula on the other. While the specialty tongs are certainly useful for their intended purpose, they are not particularly versatile in that they are typically designed for their stated objectives are not constructed to be changed after manufacture.

Accordingly, a need exists for an improved tool kit for use in cooking, grilling, and/or serving food.

SUMMARY OF THE INVENTION

It is an object of many embodiments of the present invention by an improved kitchen tool construction such as a system provided in kit form having a handle which cooperates with multiple working ends.

It is another object of many embodiments of the present invention to provide an improved cooking tool construction that provides a handle structure in the form of spring biased handle members to be able to be selectively opened and closed by a user such as for use with a plurality of interchangeable tong-based implements.

It is an object of at least some embodiments of the present invention to provide an improved tong-based handle system having a pivot located along an arm axis of one of the arms but is displaced off axis relative to the second arm member.

It is another object of many embodiments of the present invention to provide at least one embodiment having a tong-based cooking implement wherein a fork construction is provided on one arm and a spatula is provided on the other arm wherein the fork extends a distance beyond the end of the spatula for at least some embodiments.

Accordingly, a tong based tool has a versatile construction with a handle accepting implements selected from a plurality of options, possibly provided as a kit. It may be possible to put two pasta scoops on ends of the arms. It may be possible to provide grippers on the end of the arms. It may be possible to provide a spatula end, possibly with an extension so that the extended length of any of the implements, possibly relative to the other such as one spatula on one arm and another spatula on the other arm, etc. It may be possible to provide double spatula tongs as could potentially be particularly helpful in lifting such delicate items as fish and/or other items particularly for use in flipping. There may be an ability to provide a base attachment to the handle so as to secure the handle portions relative to the pivot in a fixed angular relationship for a non-squeezing configuration with a single implement extending from the base.

Additionally, the bases utilized with either of the handles could be substituted and/or added onto such as by providing a meat thermometer attachment, a light (possibly a Light Emitting Diode (LED) attachment), and/or other attachments. Accordingly, by providing a set of end tools possibly with the extensions and/or accessories, a tong-based handle construction can be utilized such as in a kit form so as to be versatile enough to accommodate a variety of uses instead of being a single-use kitchen instrument. Furthermore, some implements may be directed to cooking, some may be directed to grilling, and/or some may be directed to serving or other uses for various embodiments.

BRIEF DESCRIPTION OF THE DRAWINGS

The particular features and advantages of the inventions with other objects will become apparent from the following description taken in connection with the accompanying drawings in which:

FIG. 6 is a top exploded view of the embodiments similar to those in FIGS. 1-5;

FIG. 7 shows a side plan view of a similar embodiment to FIGS. 1-5 with a different base;

DETAILED DESCRIPTION OF THE PREFERRED EMBODIMENT

Figure 1:
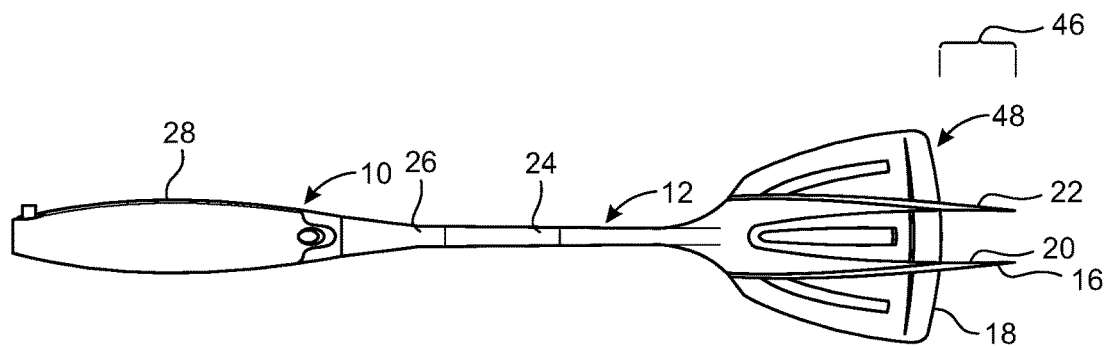
FIG. 1 is a top plan view of a presently preferred embodiment of the present invention.

FIG. 1 shows a presently preferred embodiment of the present invention often preferably provided in a kit form with a handle 10 having a first arm 12 and a second arm 14.

The first arm 12 has a fork instrument 16. The second arm 14 has a spatula instrument 18. The fork instrument 16 is shown with a pair of tines 20, 22, it being understood that any number of tines 20,22 could be utilized and that the material constituting the fork instrument 20 could be rigid such as metal fork or it could be a more resilient or flexible material like for a pasta fork, etc. for various embodiments. The fork implement 20 preferably is illustrated as connecting to a first extension 24 which may connect to a base 26 which may connect to a first handle portion 28. The first handle portion 28 preferably connects at pivot 30 to a second handle portion 32 in the illustrated embodiment.

Similarly, the spatula instrument 18 may connect with a second extension 34 to a base 36 which may connect to the second handle portion 32. The pivot 30 is preferably located collinear with the first arm 12 for many embodiments, but is preferably not collinear with the second arm 14 for many embodiments. Specifically, offset leg 38 is illustrated at an oriented angle relative to arm 14 so as to displace pivot 30 by a distance 40 off of an axis 42 along the second arm 14 which is spaced from the first axis 44 along the first arm 12. Additionally, for this embodiment, the fork instrument 20 has first and second tines 20, 22 which extend a distance 46 beyond an end 48 of the spatula 18. The Applicant has never seen this type construction before. Such a construction may be useful to assist in holding items with the fork 16 while attempting to pick up with the spatula 18. FIG. 3 shows another embodiment of the device with the handle 10 comprised of first and second handle portions 28, 32 joined at pivot 30 which is a similar construction as FIGS. 1 and 2. However, the bases 26, 36 or may not be similarly constructed as could the first and second arms 12, 14, as could be extensions 24, 34, if utilized. However, instead of having a single spatula end 18, a lower spatula end 18 is located below an upper spatula end 50 which may allow for the delicate placement of such items as fish or other things in which a double spatula end 18, 50 construction is believed to be desirable.

Figure 2:
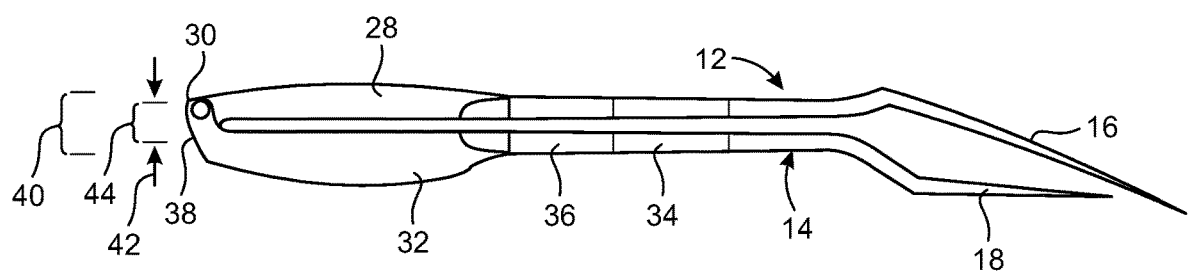
FIG. 2 is a side plan view of the embodiment of FIG. 1.
Figure 3:
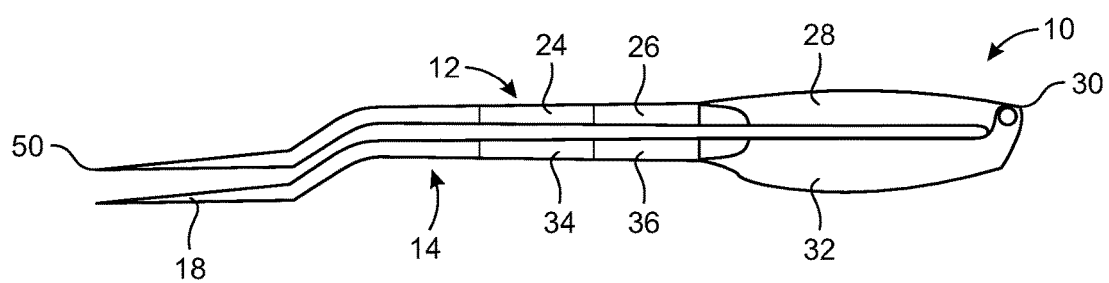
FIG. 3 is a left side view of a portion of the embodiment in FIG. 1 with an alternative tool connected to one of the other arms.
Figure 4:
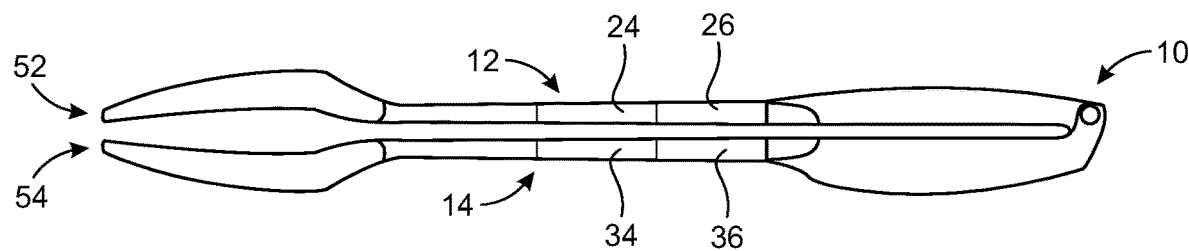
FIG. 4 is a side plan view of a similar embodiment to FIGS. 1-3 of the present invention with different tools on the arm.

When replacing a second arm 12 or portions thereof, any or all of the spatula end 50, the extension 24, and/or the base 26 could be placed or installed on the first handle portion 28 such as instead of the fork instrument 16, the extension 24 and the base 26, or vice versa as shown in FIGS. 1 and 2. FIG. 4 shows yet another set of ends of instruments installed, namely grippers 52, 54, which may be silicone-coated grippers of a somewhat traditional tong construction. Once again, the arms 12, 14 could have similar constructions to any of the above embodiments and the handle 10 could be similarly constructed as well and any of the components such as the bases 26, 36, extensions 24, 34, if utilized and/or instruments 52, 54 could be replaced individually or collectively as will be described in further detail below. With one handle 10, a plurality of instruments could be utilized for various tasks.

Figure 5:
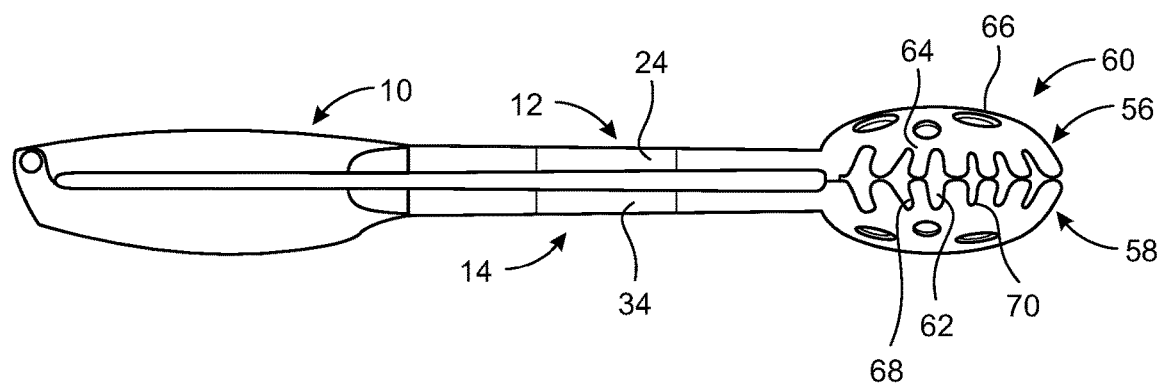
FIG. 5 is a side plan view of the embodiments of FIGS. 1-4 with different tools on the arms.

Pasta scoops instruments or ends 56 and 58 are shown in FIG. 5 while the arms 12 and 14 connected to the handle 10 and extensions 24, 34 could be utilized for such an embodiment. The Applicant is unaware of the prior art ability to provide an enclosed cage 60 utilizing the pasta scoop ends 56, 58, as shown in FIG. 5 such as to be able to improve drainage such as through slots 62 and others formed intermediate teeth 64, 66 of the first pasta scoop 56 and the teeth 68,70 of second pasta scoop 58 as would be obvious to those in the ordinary skill of the art.

FIG. 6 shows a construction with a handle 10 with this Figure showing the upper handle portion 28 connecting to a base 26 with one or more optional extensions 24 and a spatula instrument 18 or 50. The spatula may have a foot 72 possibly with an extension 74 received in a bore 76 internal to one or more extension 24 in the illustrated embodiment. Extension 24 may have a foot 78 received to a bore 78 in the base 26 and the base 26 could have a foot 80 received to bore and the handle 10 such as the upper handle portion of 28 or otherwise. The extensions or feet 74, 78, and 80 may have buttons such as button 82 thereof which can be received in slot or bore 84 of an adjacent piece, in this case the first handle portion 28 so that the button 82 could be depressed thereby moving away sufficiently so as to be able to be released and thus the base 26 removed relative to the first handle portion 28 as would be understood by those in the ordinary skill of the art. Similar and dissimilar construction can be relative to the extension 24 relative to the base 26 and/or the extension 74, etc.

FIG. 7 shows a somewhat similar construction as FIG. 6 except that the base 86 may be somewhat differently constructed in that it may have two legs as well as a shoulder 88 received with the legs (not shown) received internal to the first and second handle portions 28, 32. The shoulder 88 may space the two legs so as to securely connect the base 86 to both the first and second handle portions 28, 32, so that there is no tong-like activity with this embodiment. Specifically, from the base 86 may be connected to an extension 24 and a spatula instrument 18. Other instruments other than spatulas could be utilized with this construction as could one, more, or no extensions 24 for the various embodiments (specifically the leg 78 of the spatula 18 could cooperate directly with the base 86 as would be understood by those ordinarily skilled in the art.

Figure 8:
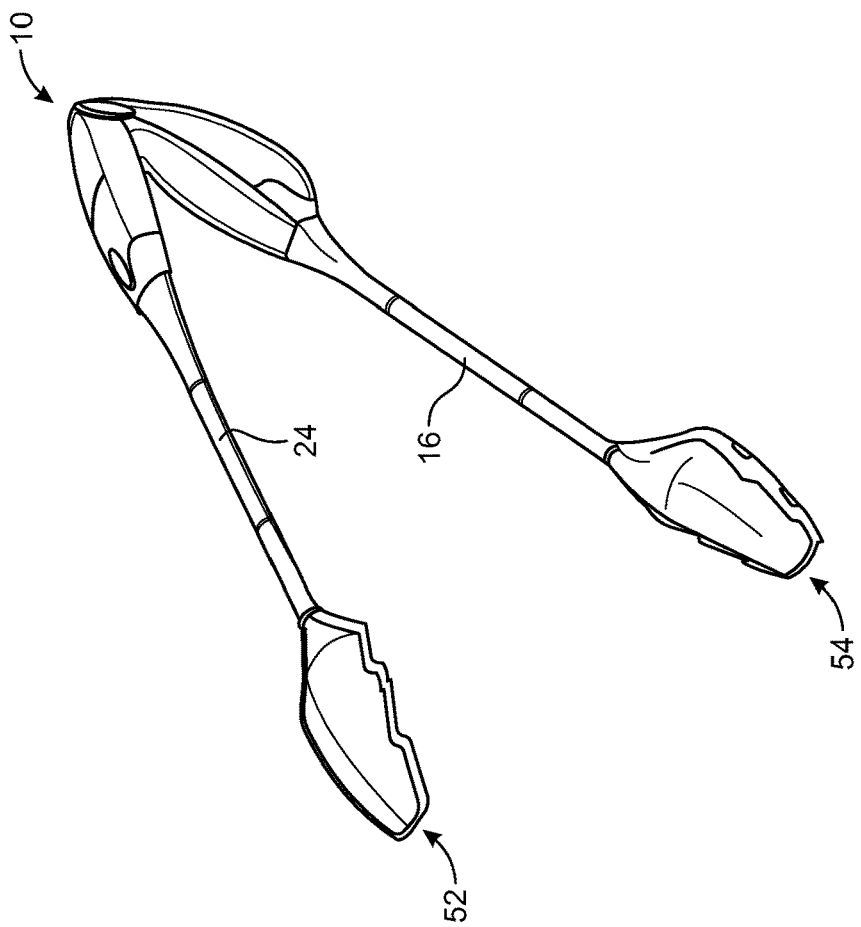
FIG. 8 shows a top perspective view of an embodiment similar to FIG. 4.
Figure 9:
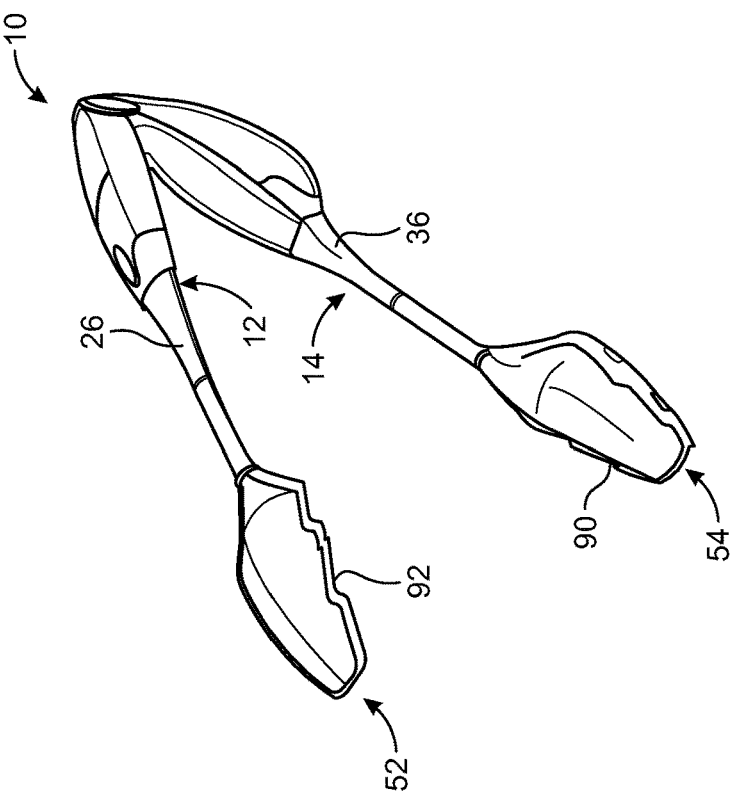
FIG. 9 is a top perspective view of the embodiment of FIG. 4.
Figure 10:
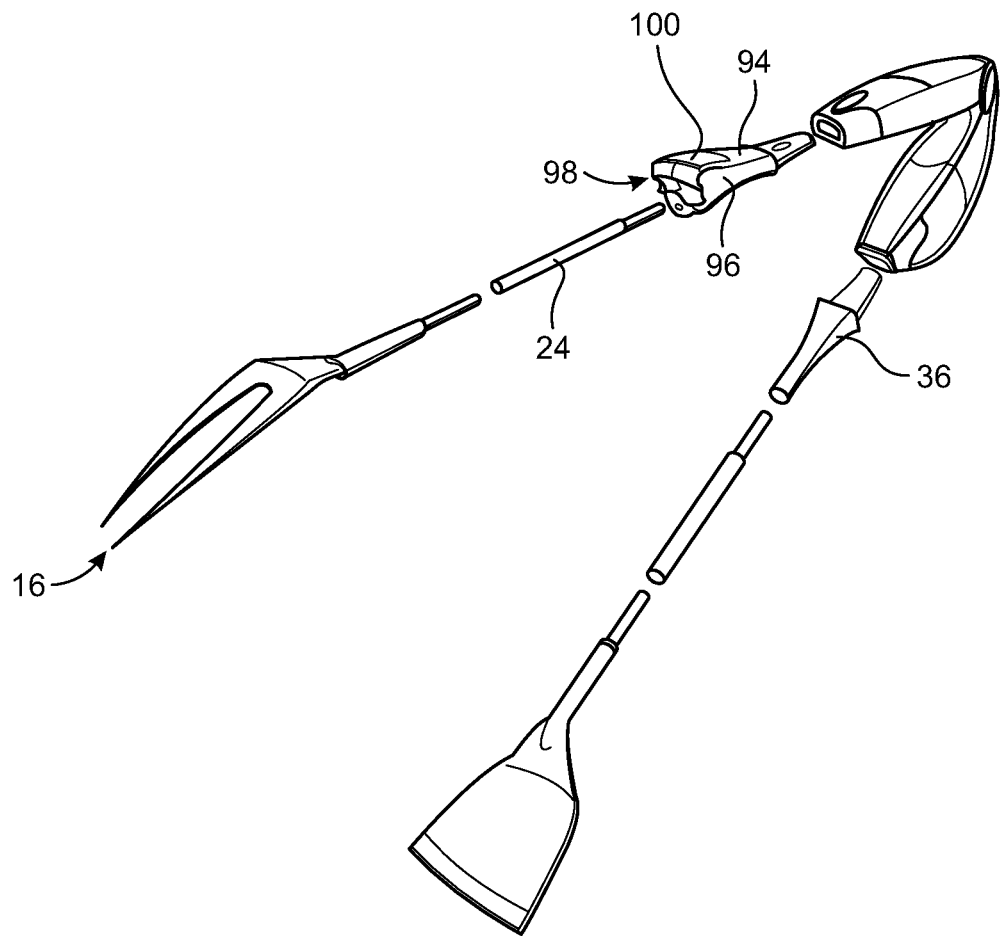
FIG. 10 is an exploded perspective view of the embodiments of FIGS. 1 and 2 with an alternately preferred base attachment construction.

FIGS. 8-10 show the handle 10 in an open configuration with the first arm 12 angularly displaced relative to the second arm 14. No extensions are provided in the embodiment of FIG. 8. Instead, the first gripper portion 52 is shown spaced apart from the second gripper portion 54 with silicone coverings.

The gripper instruments 52, 54 or other ends may have silicone coverings. The legs such as leg 78 and/or others could be metal or other material. The extensions 24, 34 could be metal or other material as could the bases 26, 36, etc. Handles 10 could be any appropriate material whether wood, glass, metal, or other materials, as well as combinations thereof. Those constructions could be particularly useful in such embodiments as handling food over fire and other considerations.

Finally, FIG. 10 shows another embodiment somewhat similar to that of FIG. 1 except that the alternatively preferred embodiment has a base 94 substituted for base 26. This base 94 has a housing 96 having at least one of a light 98 and/or a readout 100. The light 98 may be a flashlight (such as a light emitting diode or other light source) so as to be able to assist when handling food in the dark. The display 100 might be the readout of a thermometer which could be connected through the extension 24 if utilized and/or the fork 16 or other end so that a readout of temperature of meat or other material could be provided to a user. For other embodiments, the housing 96 could be utilized in conjunction with similar lights and/or displays with bases 26, 36, etc.

In the presently preferred embodiment, a handle 10 may be provided in a kit, most likely two extensions 24, 34, as well as a plurality of instruments whether it be spatula instruments 18, 50, one or more fork instruments 16, one or more gripper instruments 52, 54, one or more pasta grips 56, 58, and/or other instruments. With such a construction or a kit, a relatively compact kit could be provided to consumers of a desired quality such as for gift purposes and/or to simplify the cookware utilized by a user while still improving the versatility, utility, flexibility and control of the user.

One aspect of the embodiment not discussed in significant detail above is the ability to have the gap or offset nature of the first axis 42 relative to the second axis 44 for the pivot 30 located along the second axis 44. This type construction makes the pivot 30 work somewhat differently than traditional tongs. Specifically, when one were to grip the handle 10, they would tend to use this type construction more like chopsticks with a primary and secondary arm with the primary arm being substantially held in place and the second arm being moved relative thereto for at least some uses. It is still possible to move both of them in relative motion, but moving of the secondary relative to the primary may be preferred. The Applicant believes that this type construction gives the user more control for at least some embodiments than over traditional tongs where the pivot is aligned along the axis of both arms in a symmetrical manner and not in an asymmetrical manner as provided in the present preferred embodiments.

Figure 11:
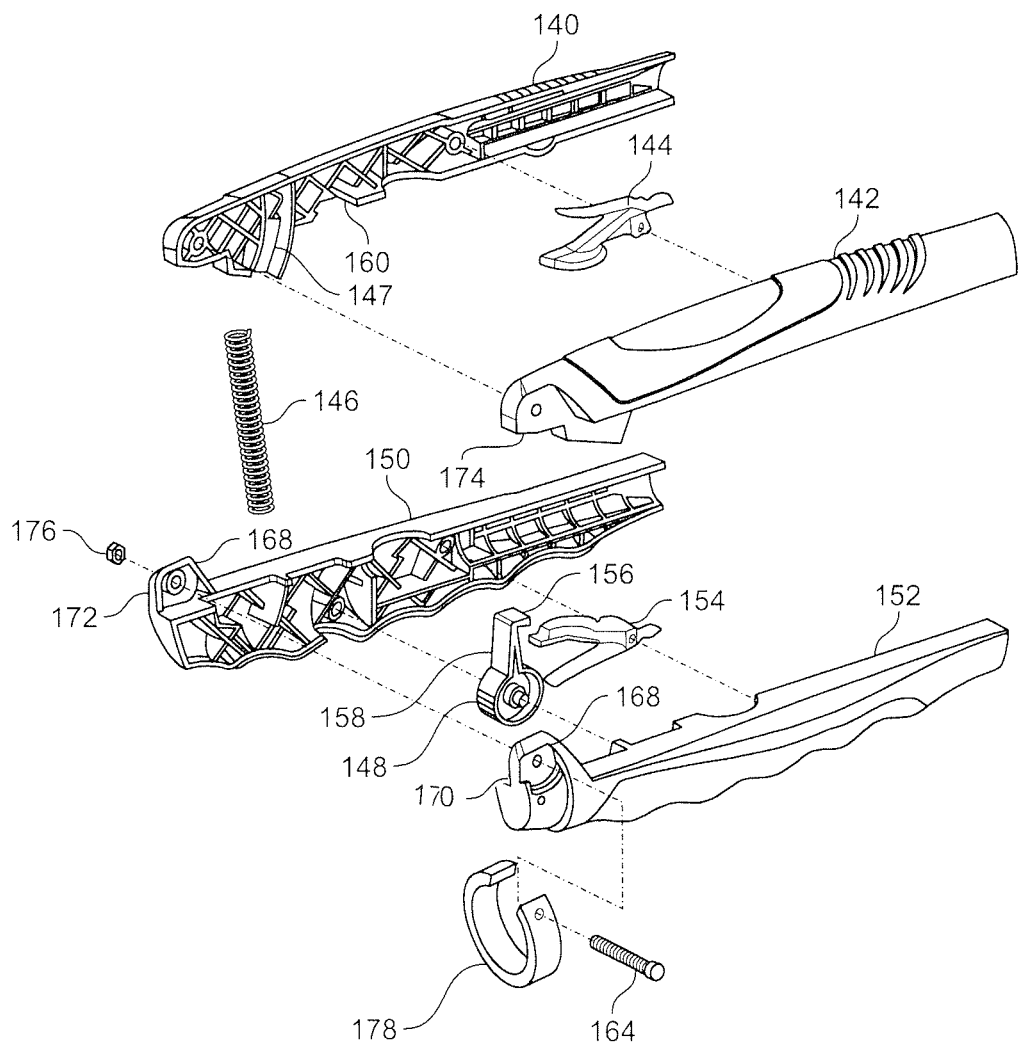
FIG. 11 is an exploded view of a handle design of a first alternatively preferred embodiment.

FIG. 11 shows a handle 100 in an exploded view having asymmetrical first and second handle portions 128,130 connected at a pivot 132. The pivot 132 is disposed substantially collinearly with first handle portion 128 displaced by leg 138. Each of first and second handle portions 128,130 may be constructed in various manners as is known in the art, such as by molding and/or overmolding and possibly welding, adhering and/or mechanically joining parts together to form the first and second handle portions 128,130.

Figure 13:
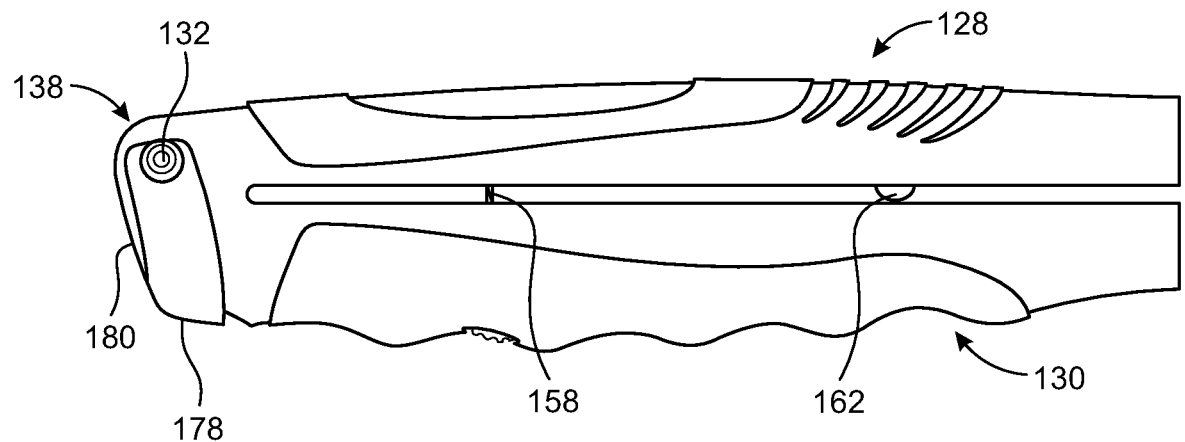
FIG. 13 is a side plan view of the handle of FIGS. 11-12.
Figure 14:
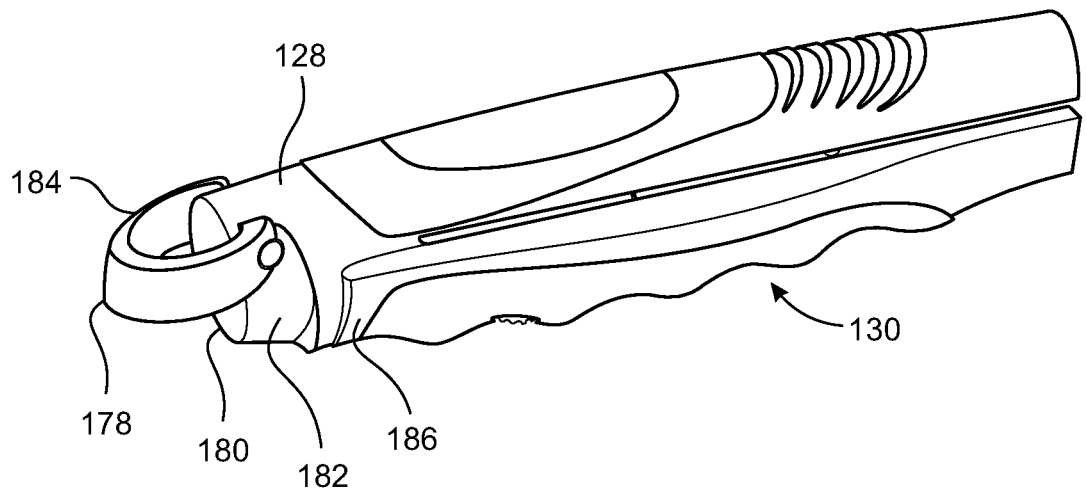
FIG. 14 is a perspective view of the handle of FIGS. 11-13.

FIG. 11 shows first handle portion 128 having a left and a right portion 140,142 with a first lock 144 to be disposed therebetween. A spring 146 may extend into slot 147 shown in the left portion 140 (but a corresponding slot may also exist in the right portion 142) so that the first and second handle portions 128,130 may be biased apart from one another about pivot 132. Rotating lock 148 may be retained between left and right portions 150,152 of second handle portion 130 along with a second lock 154 which may selectively engage and or release the rotating lock, such as when arm 156 supported by leg 158 catches within catch slot 160 to maintain the first and second handle portions substantially parallel, if not parallel as s own in FIG. 13 or otherwise. A stop such as extending from a first or second handle portion 128,130 toward the other may determine a maximum close position (such as to keep from pinching fingers or other items between the first and second handle portions 128,130 inadvertently.

Pivot 132 may be assisted in being defined with a screw 164 extending through bores 166, 168 in opposing shoulders 170,172 on the second handle portion 130 and through a passage 174 formed through both left and right portions 140,142 of the first handle portion 128 and into a nut 176. Screw 164 and nut 176 may secure a loop 178 to the handle 100 which may be flush with end 180 in a first configuration and pivot about pivot 132 to extend angularly relative to end 180 such as to assist in hanging in a hanging configuration. Recess 182 may receive a portion of loop 178 in the first configuration so that an exterior surface 184 of loop 178 may be substantially if not continuous with an exterior surface 186 of second handle portion 130 in the first configuration.

Figure 12:
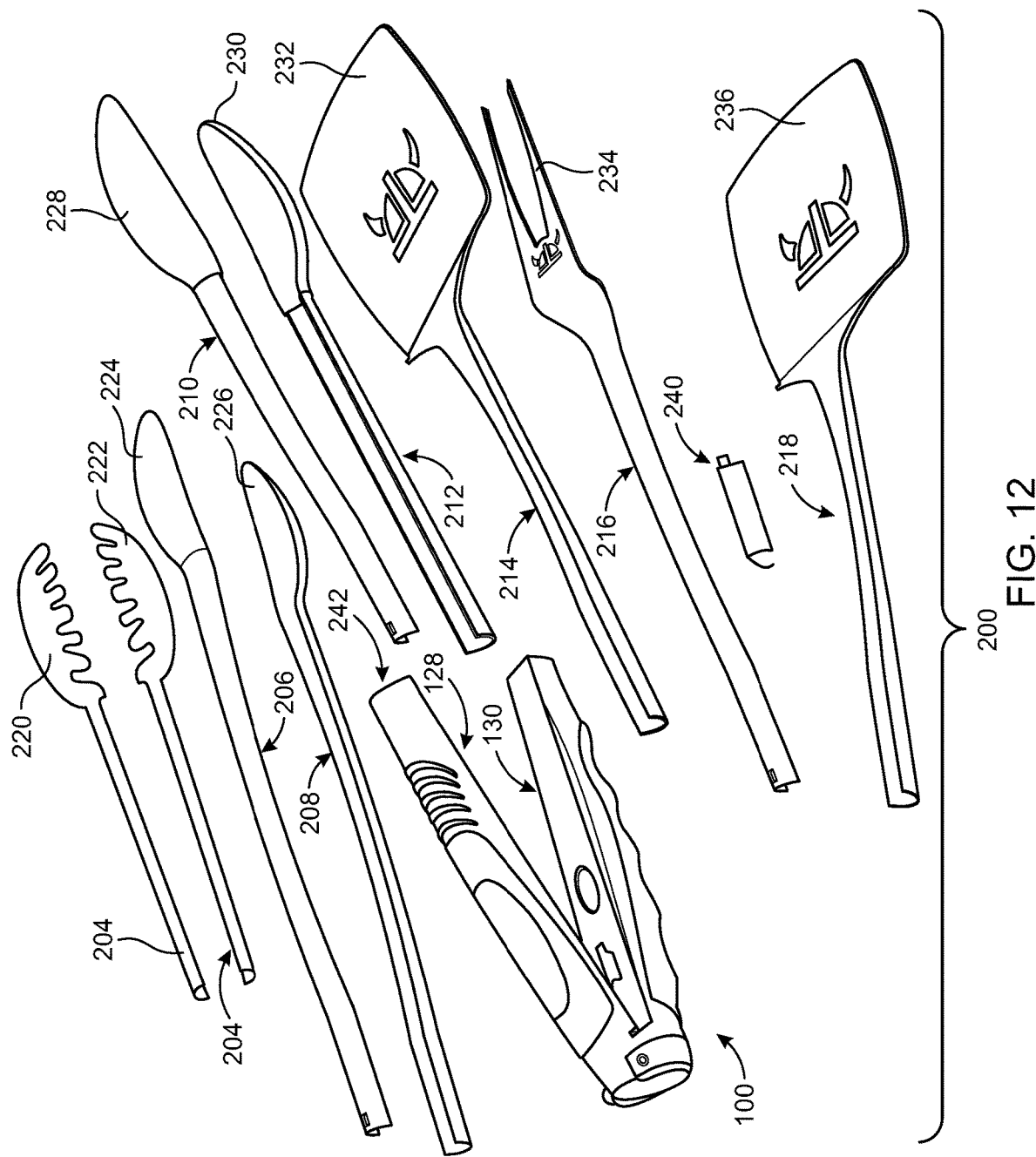
FIG. 12 is a perspective view of the handle of FIG. 11 with various implement ends provided in a kit form.

FIG. 12 shows and embodiment of a kit 200 having a single handle 100 with a plurality of implement arms 202 204,206,208,210, 212, 214, 216, 218 and/or others. Implement arms 202-218 may have various implement heads 220, 222,224,226,229,230, 232, 234, 236, 238 or others. Implement arms 202-218 may be unitary with heads 220-238 or be segmented such as by providing selectively usable extensions 244 which may be optional to extend the length, or not, if not utilized. Implement arms 202-218 of various links, possibly having the same configuration of heads 220-238 may be provided with some kits.

Base 240, whether a temperature sensor or light may connect at an end 242 of a handle portion such as first handle portion 128.

The first handle portion 28 may also be differently sized relative to the second handle portion 30 for at least some embodiments. A size differential of a ratio of approximately 40/60 has been found effective to provide an advantageous feel, and or other effect, particularly with the offset nature of the second axis 44 relative to the first axis 42. The size differential may be a volume and/or a weight ratio of the first handle portion 2 to the second handle portion. 30. Other embodiments may have similarly sized first and second handle portions 28,30 and/or have other ratio of differences. This may also be referred to as asymmetrical first and second handle portions 28,30. Other size differentials other than 40/60 may be provided with various embodiments having asymmetrical first and second handle portions 28,30.

Numerous alterations of the structure herein disclosed will present themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

Having set forth the nature of the invention, what is claimed herein is:

1. A kit comprising:
    a handle having first and second asymmetrical handle portions connected at a pivot, the pivot located along an axis of the first handle portion and connected by an offset leg to the second handle portion;
    at least four arms having instrument heads, said instrument heads selected from the group of a spatula, a fork, a tong, and a gripper, and two of said at least four arms selectively connected to respective first and second handle portions; and
    a loop connected at the pivot extending about a portion of the second handle portion in a storage configuration wherein the loop extends into a recess of the second handle portion in the storage configuration and an exterior surface of the loop is continuous with a portion of an exterior surface of the second handle portion.

2. The kit of claim 1 further comprising a base connected to the first handle portion and one of the two of the at least four arms, said base having at least one of a light and a temperature sensor.

3. The kit of claim 1 wherein the loop pivots to a first position about the pivot beyond an end of the second handle portion.

4. The kit of claim 1 wherein the two of the at least four arms selectively connected to the first and second handle portions have spatulas as the instrument heads.

5. The kit of claim 1 wherein the two of the at least four arms selectively connected to the first and second handle portions have an instrument heads of a fork and a spatula and the fork extends a length beyond a maximum length of the spatula at a spatula end from the second handle portion.

6. The kit of claim 5 wherein the tines of the fork exert a force toward the handle thereby assisting in preventing material from passing off the spatula end.

7. The kit of claim 1 wherein at least one of the at least four instrument arms is segmented and selectively connectable to provide at least two different lengths for the at least one of the at least four instrument arms.

8. The kit of claim 1 wherein the two of the at least four arms selectively connected to the first and second handle portions have pasta forks as the instrument heads.

9. The kit of claim 1 wherein the second handle portion has shoulders on the offset leg which receive a portion of the first handle portion therebetween at the pivot.

10. The kit of claim 1 further comprising further comprising a base connected to the first handle portion, and one of the two of the at least four arms, said base having at least one of a light and a temperature sensor.

11. The kit of claim 1 wherein the two of the at least four arms selectively connected to the first and second handle portions have an instrument heads of a fork and a spatula and the fork extends a length beyond a maximum length of the spatula at a spatula end from the second handle portion.

12. The kit of claim 1 wherein at least one of the at least four instrument arms is segmented and selectively connectable to provide at least two different lengths for the at least one of the at least four instrument arms.

13. The kit of claim 1 wherein the two of the at least four arms selectively connected to the first and second handle portions have spatulas as the instrument heads.

* * * * *